United States Patent [19]

Niiro et al.

[11] 4,201,959
[45] May 6, 1980

[54] AUTOMATIC EQUALIZATION SYSTEM

[75] Inventors: Yasuhiko Niiro, Yokohama; Hiroharu Wakabayashi, Tokyo, both of Japan

[73] Assignee: Kokusai Denshin Denwa Co., Ltd., Tokyo, Japan

[21] Appl. No.: 854,103

[22] Filed: Nov. 23, 1977

[30] Foreign Application Priority Data

Nov. 24, 1976 [JP] Japan .................... 51/140161

[51] Int. Cl.² .......................... H04B 3/10
[52] U.S. Cl. .................... 333/16; 179/170 A; 333/18; 375/11; 375/36
[58] Field of Search ............ 333/16, 18; 325/2, 13, 325/62, 323; 179/170 A, 170.4; 178/69 N

[56] References Cited

U.S. PATENT DOCUMENTS

| 3,177,429 | 4/1965 | Märkl | 333/16 X |
| 4,028,644 | 6/1977 | Niiro | 333/16 |

OTHER PUBLICATIONS

Hermes et al., *Level Regulation, A Decisive Feature of Coaxial Line Equipment*, Philips Telecommunication Review, vol. 30, No. 1, Dec. 1971.

*Primary Examiner*—Paul L. Gensler
*Attorney, Agent, or Firm*—Armstrong, Nikaido, Marmelstein & Kubovcik

[57] ABSTRACT

In a long line transmission system, the signal level at the transmission station is pre-equalized by the value $L_s$ which is adjustable according to the signal level at the receiving station. The receiving station equalizes the received signal to the standard level at the output of the receiving station. The difference between the actual level $L_r$ at the input of the receiving station and the standard level there, is fed back to the transmission station through a return transmission line, and said difference is utilized to adjust the pre-equalization value $L_s$ at the transmission station. The ratio $L_s/L_r$ is controlled to be constant by the operation of the pre-equalization level distributor installed at the transmission station.

6 Claims, 7 Drawing Figures

AUTOMATIC EQUALIZATION SYSTEM

BACKGROUND OF THE INVENTION

The present invention relates to an automatic equalization system for a line transmission system. It is well known that in a submarine cable system, the level diagram in the system fluctuates reflecting the change of the temperature at the sea-bottom, as the signal attenuation by a cable depends upon the temperature. Furthermore, the aging of cables and repeaters provide the fluctuation of the signal level in a cable. Most of theses level fluctuations have a frequency characteristics of the $\sqrt{f}$ type. The level variation or level fluctuation has various aspects. The level variation caused by the temperature change in a day has the repetition period of several hours, and has the seasonal level variation due to the seasonal temperature change. The level variation caused by the aging results in slow changes over life of the system. As the level variation in a cable system causes the degradation of the signal-to-noise ratio of the system, or overloads the repeaters in the system, a temperature equalizer is equipped in both the terminal stations of a cable system. Further, a pilot control type automatic equalizer is utilized for a submarine cable laid in shallow sea, for the purpose of the compensation of the short period level variations, in addition to the temperature equalizer for the seasonal level variations. However, a prior temperature equalizer for the seasonal level variation is a step-by-step equalizer which is adjusted by a maintenance engineer every time the pilot level variation exceeds a predetermined value. The maintenance operation such as above must be simplified while a higher precision of equalization is desirable. Consequently, the introduction of an automatic continuous variable type equalizer is desirable. Further, a prior pilot control type automatic equalizer is a so-called receiving terminal equalizer which equalizes the level variation within a cable system at the receiving terminal only. However, it should be appreciated of course that a pre- and post- equalization system which shares the equalization at both the transmission and receiving terminals is desirable in view of improving the signal-to-noise ratio.

One of the prior pre- and post- equalization systems has a memory for storing the operational level of the transmitting equalizer, and a calculator for calculating the difference between the stored level and the pilot level variation at the receiving terminal, and thus, the transmitting equalizer is controlled. However, said prior pre-equalizer has the disadvantages that the equipment is very large and uneconomical.

SUMMARY OF THE INVENTION

It is an object, therefore, of the present invention to overcome the disadvantages and limitations of the prior equalization system by providing a new and improved pre- and post- equalization system.

The other object of the present invention is to provide a pre-equalization system of an automatic continuously variable type incorporating a simple structure, which can equalize aging of cables and repeaters, seasonal variations and short period variations of the signal.

The above and other objects are attained by a pre- and post- equalization system having a transmitting equalizer at the transmission station, a receiving equalizer at the receiving station and a transmission line provided between the two stations, comprising a pilot signal generator provided at the input of the transmitting equalizer, means for detecting the level of the pilot signal at the output of the transmitting equalizer, means for detecting the level of the pilot signal at the input of the receiving equalizer, means for transmitting the signal relating to the detected level at the input of the receiving equalizer back to the transmitting station, and means for controlling the gain of the transmitting equalizer so that the sum of the detected level at the output of the transmitting equalizer and the detected level at the input of the receiving equalizer becomes a predetermined value.

BRIEF DESCRIPTION OF THE DRAWINGS

The foregoing and other objects, features and attendant advantages of the present invention will be appreciated as the same become better understood by means of the following description and accompanying drawings wherein.

DESCRIPTION OF THE PREFERRED EMBODIMENTS

Figure 1A:
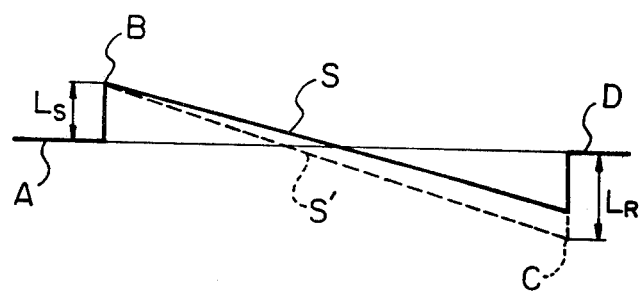
FIG. 1 (A) is the system level diagram along a transmission line for the explanation of the principle of the present invention, FIG. 1 (B) is the system block diagram of the present equalization system.
Figure 1B:
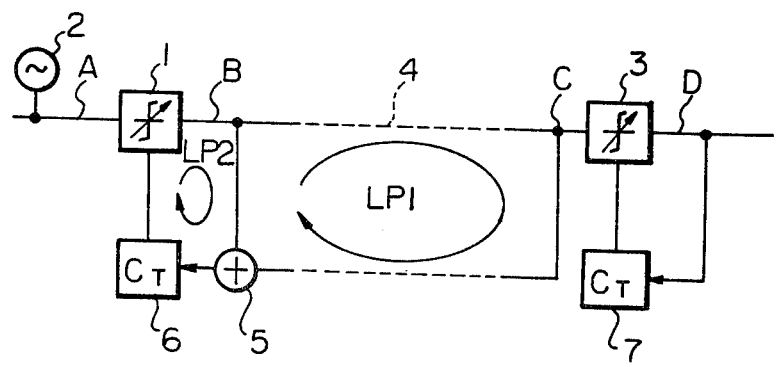
Figure 2:
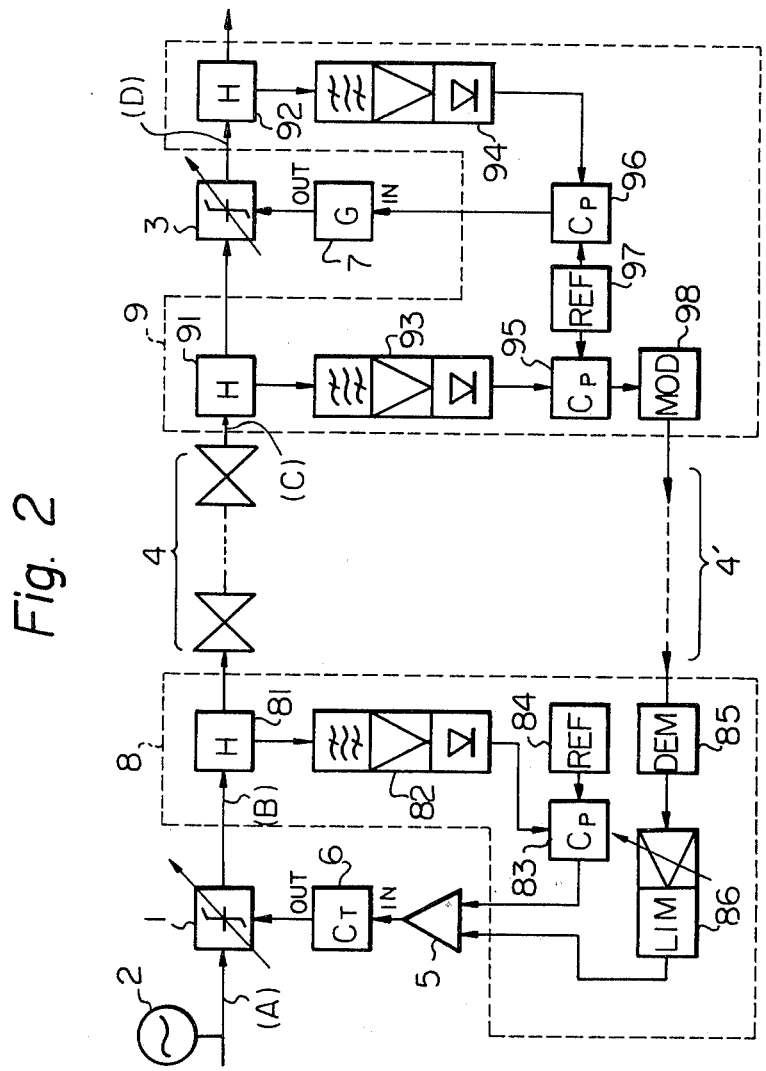
FIG. 2 is the detailed block-diagram of the present equalization system.

FIG. 1 (A) is the level diagram of a transmission line according to the present invention, FIG. 1 (B) is the brief system block diagram of the present pre- and post-equalization system, and FIG. 2 is the detailed block diagram of the present pre- and post- equalization system. It is supposed that the signal level at the points A and D is the standard level, and the transmitting equalizer 1 performs the pre-equalization by raising the level by $L_s$, therefore, the signal level at the point B which is the output of the transmitting equalizer 1 is shown in the drawing. In a cable system, the signal level is lowered as indicated by the solid line S or the dotted line S', and the receiving equalizer raises the signal level by $L_r$ and thus, the signal level at the point D becomes the standard level. The signal level in a cable system varies like the lines S and S'. In FIG. 1 (B), the pilot signal generator 2 is provided at the input of the transmitting equalizer 1, and the signal level of the pilot signal is detected at the point B which is the immediate output of the transmitting equalizer 1, and at the point C which is the immediate output of the cable and is the immediate input of the receiving equalizer 3. The signal about the pilot level (C) at the immediate input of the receiving equalizer 3 is inversely transmitted to the transmitting station through the transmission line 4. At the transmitting station, the adder 5 provides the sum of the pilot level (B) at the output of the transmitting equalizer 1 and the returned pilot level (C), and the transmitting equalizer is so controlled by the controller 6 that the sum of said adder 5 is constant. It should be appreciated that the control system of the transmitting equalizer has a complete closed loop, and thus the wrong operation of the transmitting equalizer can be prevented. On the other hand, the receiving equalizer 3 is controlled by the controller 7 so that the pilot level at the point D which is the immediate output of the receiving equalizer 3 is the standard level.

In the block diagram in FIG. 2, the reference numeral 1 is the transmitting equalizer, 2 is the pilot signal generator for generating the pilot signal for detection of level variation, 3 is the receiving equalizer, 4 is the transmission line to the receiving station, 4' is the transmission line from the receiving station to the transmitting station, 5 is the adder, 6 and 7 are controllers for the transmitting and receiving equalizers, respectively, and 8 and 9 are drive circuits for driving the controllers 6 and 7, respectively. The drive circuit 8 has the hybrid circuit 81, the detection circuit 82, the comparator 83, the reference voltage source 84, the demodulator 85, and the distributor 86. The drive circuit 9 has the hybrid circuits 91 and 92, the detection circuits 93 and 94, the comparators 95 and 96, the reference voltage source 97, and the modulator 98.

Now, the operation of the present pre- and post-equalization system will be explained below.

The pilot signal generated by the pilot signal generator 2 is transmitted to the receiving station through the transmitting equalizer 1, the hybrid circuit 81, and the transmission line 4. Then said pilot signal is branched by the hybrid circuits 91 and 92, and each of the output of the hybrid circuits 91 and 92 are converted to a direct current by the detection circuits 93 and 94, respectively. The outputs of said detection circuits 93 and 94 are applied to the inputs of the comparators 95 and 96, the other inputs of which receive the reference voltage (for instance 0 level) from the reference voltage source 97. It should be appreciated that the reference voltage relates to the standard input level at the reception station, that is, the level at the input of the hybrid circuit 91. The comparators 95 and 96 provide the difference between the standard level and the actual received pilot level. Said difference is equivalent to the difference $L_r$ between the standard level and the received pilot level, supposing that the level of the transmission line 4 has shifted to the level depicted by the dotted line in FIG. 1 (A).

The output of the comparator 95 is modulated by the modulator 98 (for instance, an FM modulator) and is transmitted back to the transmitting station through the transmitting line 4'. It is then demodulated by the demodulator 85 at the transmitting station, and the direct current the level of which corresponds to the difference between the actual pilot level at the point (C) and the standard level there is obtained at the output of the demodulator 85. The output of the demodulator 85 is applied to one input of the adder 5 through the pre-equalization level distributor 86 (to be explained later). On the other hand, the pilot signal branched by the hybrid circuit 81 in the transmitting station is converted to the direct current by the detection circuit 82 and is applied to one input of the comparator 83. The other input of the comparator 83 receives the output of the standard voltage source 84 relating to the standard level at the point (B). The comparator 83 provides the difference between the two inputs, said difference is equivalent to $L_s$, which is the difference between the standard level at the point (A) in FIG. 1 (A) and the pilot level there. The output of the comparator 83 is applied to one input of the adder 5, the other input of which receives the output of the pre-equalization distributor 86. The output of the adder 5, which is the sum of the output of the comparator 83 and the output of the pre-equalization distributor 86 is applied to the controller 6, which controls the transmitting equalizer 1 so that the output of the adder 5 becomes zero.

On the other hand, at the reception station, the output of the comparator 96 is applied to the controller 7, which controls the receiving equalizer 3. As mentioned above, the level variation in a cable system is equalized through the control of the transmitting equalizer and the receiving equalizer. The time constant of the system operating in this manner is normally several ms at the Loop LP2 in FIG. 1 (B), and several tens of ms at the Loop LP1 in the international long distance circuit including the delay time of the signal in the line. The shortest period of level variation caused in the transmission line 4 is about a half day. Therefore, even if the time constant of the transmitting equalizer is around several minutes, the level variation of the transmission line can be faithfully followed. Furthermore, performance characteristics are highly stable. The time constant of the receiving equalizer 3 is independent of the control loop of the transmitting equalizer and can be freely established independent of the transmitting side.

Figure 3:
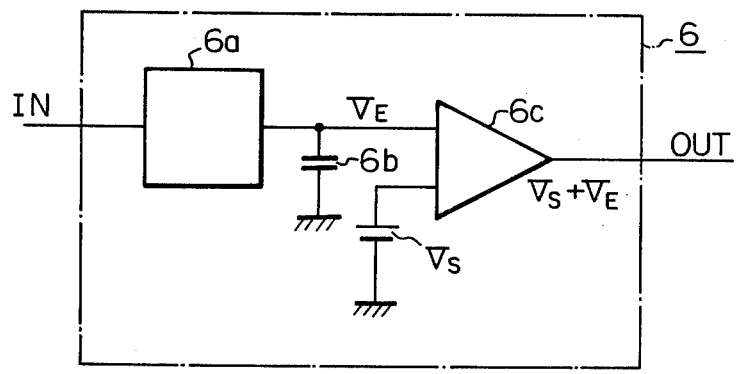
FIG. 3 is the detailed block-diagram of the control circuits 6 and 7 in FIG. 2.

FIG. 3 shows the embodiment of the block diagram of the control circuit 6 (control circuit 7). In the figure, the reference numeral 6a is a voltage current convertor which provides the output current proportional to the input voltage. However, when the absolute value of the input voltage exceeds the predetermined value, the output current does not exceed the predetermined value. 6b is the capacitor, $V_s$ is the reference voltage source, and 6c is the adding amplifier. Supposing that the system is stable when the voltage $V_e$ of the capacitor 6b is zero and the output voltage of the control circuit 6 is $V_s$, and an external disturbance changes the stable level of the system, then the gain of the transmitting equalizer 1 and/or the gain of the receiving equalizer 3 must be raised. In that case, the voltage relating to the control volume is generated in the control circuit 6, and the capacitor 6b is charged by the output of the voltage-current convertor 6a. As a result, the voltage $V_e$ rises, and the output of the control circuit 6 ($V_s + V_e$) rises, and then the gain of the transmitting equalizer or the receiving equalizer rises. As the gain of the equalizer approaches the desired value, the input voltage of the control circuit 6 decreases. When the gain of the equalizer becomes equal to the desired value, the input voltage of the control circuit 6 becomes zero and the supply of the electric current to the capacitor 6b stops. At this moment, the voltage $V_e$ across the capacitor 6b maintains the gain of the equalizer to the desired value, and the equalizer now has the characteristics of being controlled by the voltage ($V_s + V_e$).

Figure 4:
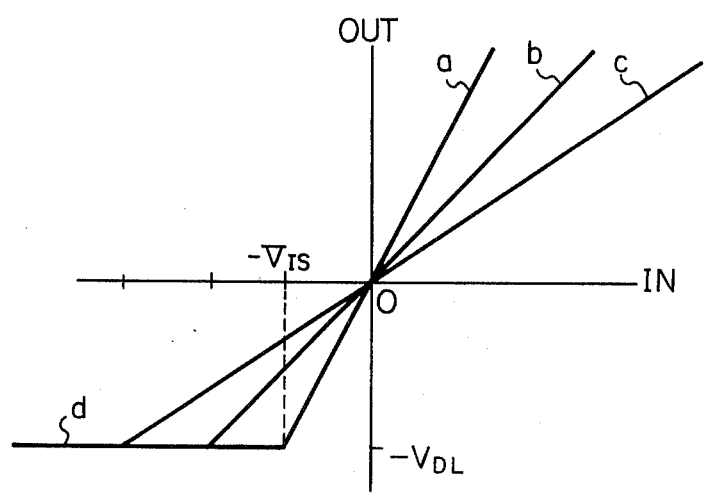
FIG. 4 is the characteristics curve of the pre-equalization level distributor 86 in FIG. 2, FIGS. 5 (A) and 5 (B) are operational diagrams for the explanation of the operation of the pre-equalization level distributor.

Now, the pre-equalization level distributor 86 (FIG. 2) will be explained. The pre-equalization level distributor 86 comprises a variable gain DC amplifier and a limiter as shown in FIG. 2. The relationship between the input level and the output level of the distributor is illustrated in FIG. 4. The tilted portion of the characteristics curve may be made to shift like a, b, and c by adjusting the gain of the DC amplifier. At the same time, if the output voltage becomes smaller than $-V_{dl}$ by the operation of the limiter, the output of the pre-equalization level distributor 86 is maintained at the given voltage ($-V_{dl}$) as indicated by the linear line d for all the curves a, b and c. The saturated voltage $V_{dl}$ responds to the maximum gain of the transmitting equalizer on the condition that the repeaters in the cable system do not overload.

Figure 5:
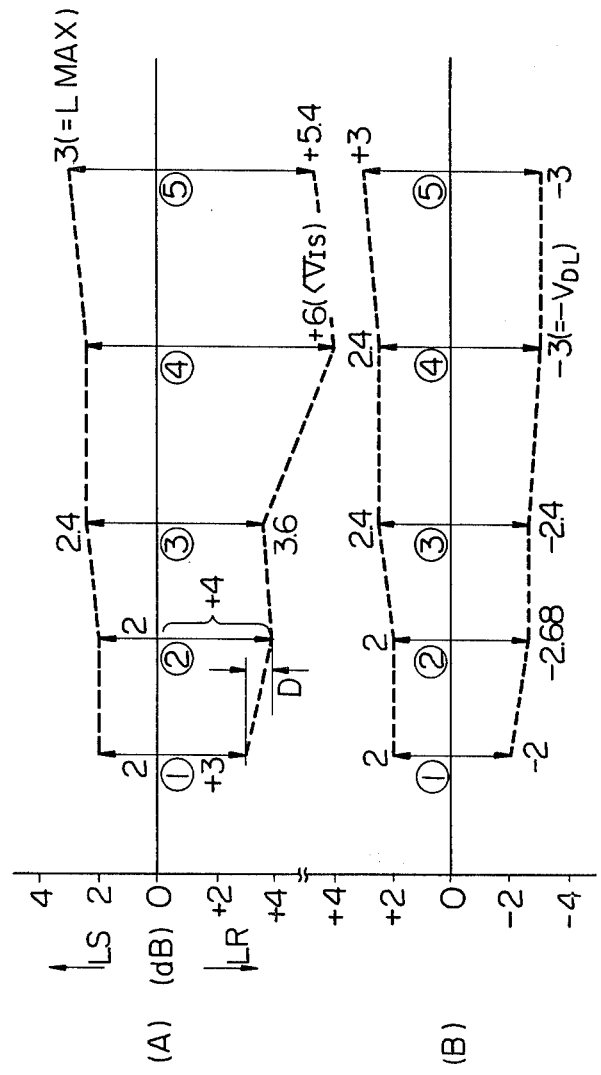

FIG. 5 shows the operation of the pre-equalization level distributor. FIG. 5 (A) shows the operation of the same when the ratio ($L_s:L_r$) is 1:1.5, and the gain of the variable gain DC amplifier is 0.67. It should be appreciated that said ratio can be defined by the tangent a, b or c in FIG. 4. FIG. 5 (A) shows the change of $L_s$ and $L_r$ in FIG. 1 (A), and the upper portion of FIG. 5(B) indicates the output of the comparator 83 in FIG. 2, and the lower portion of FIG. 5(B) indicates the output of the pre-equalization level distributor 86. It is assumed that the level in the transmission line dropped from the normal level (1) by 1 dB. This situation is indicated in FIG. 5 (A) at (2), and the outputs of the comparator and the pre-equalization level distributor in this situation are $+2$ and $-2.68(=-4\times 0.67)$ respectively, as shown at (2) in FIG. 5 (B). The transmitting equalizer is adjusted so that the sum of these outputs becomes zero. Therefore, when the $L_s$ and $L_r$ become $+2.4$ dB and $+3.6$ dB, respectively as shown at (3) in FIG. 5 (A), said outputs becones $+2.4$ dB and $-2.4$ dB, respectively as shown at (3) in FIG. 5 (B), and the sum of those outputs becomes zero. Thus, the equalization share (the ratio $L_s:L_r$) is maintained at 1:1.5.

Next, when the level at the receiving station falls too much as shown at (4) in FIG. 5 (A), the output of the demodulator 85 in FIG. 2 falls below $-V_{is}$ in FIG. 4. In this case, the output of the pre-equalization level distributor has the constant value $-V_{dl}$, and the gain of the transmitting equalizer does not exceed $L_{max}$ (for instance $+3$ dB) as shown at (5) in FIG. 5 (A). Therefore, the repeaters in the communication system do not overload.

Figure 6:
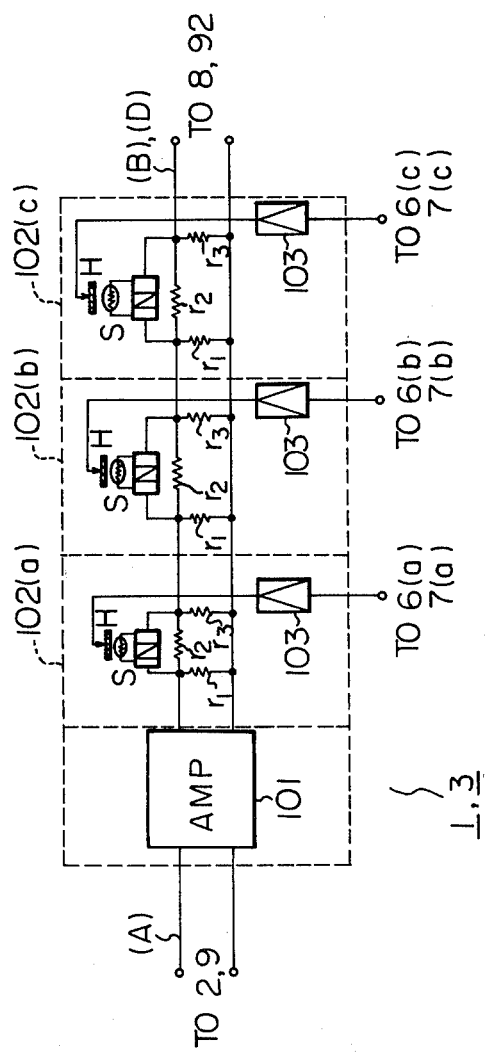
FIG. 6 is the block-diagram of the transmitting equalizer and the receiving equalizer.

Although the explanation above is directed to the one point equalization system using a single pilot signal, the present invention is applicable to the equalization system in which a plurality of pilot signals are utilized for equalizing the system at a plurality of points. In that case a plurality of pilot signal generators and the corresponding number of driver circuits 8 and 9, and the corresponding number of controllers 6 and 7 are utilized. FIG. 6 shows the block-diagram of the equalizer 1 and/or 3 in which the signal levels at three different frequency points are equalized. In FIG. 6, the amplifier 101 amplifies the input signal uniformly, and the output of the amplifier 101 is equalized by the first equalization section 102(a), the second equalization section 102(b), and the third equalization section 102(c), each of which equalizes the level at the first, second and third frequency point. Each equalization section is a variable attenuator having resistors $r_1$, $r_2$ and $r_3$, LC (inductance and capacitance) network N, a thermistor S, a heater H, and a buffer amplifier 103. The output of the controller 6 or 7 (6(a), 6(b), 6(c), 7(a), 7(b), 7(c)) is applied to the buffer amplifier 103, the output of which is fed to the heater H, which controls in turn the value of the resistance of the thermistor S. Thus, the attenuation at each frequencies is controlled by the output of the controller 6 and 7.

It should be appreciated of course that the digital control of the system is of course possible although the embodiments hereinbefore are mainly directed to an analog control.

It should be appreciated that the present invention is applicable to wire communications including submarine cable communication and overland cable communication, although the embodiment disclosed relates to a submarine cable system.

As explained above, the present invention provides the variable share of the equalization between the transmission station and the reception station, and the repeaters in the system do not overload. The level variation in the system can be equalized with high precision and high stability.

From the foregoing it will now be apparent that a new and improved pre-equalization system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An automatic equalization system having a transmitting equalizer at the transmission station, a receiving equalizer at the receiving station and a transmission line provided between the two stations, comprising a pilot signal generator provided at the input of the transmitting equalizer, means for detecting the level of the pilot signal at the output of the transmitting equalizer, means for detecting the level of the pilot signal at the input of the receiving equalizer, means for transmitting the signal relating to the detected level at the input of the receiving equalizer back to the transmitting station, and means for controlling the gain of the transmitting equalizer so that the sum of the detected level at the output of the transmitting equalizer and the detected level at the input of the receiving equalizer becomes a predetermined value.

2. An automatic equalization system according to claim 1, further comprising means for detecting the level of the pilot signal at the output of the receiving equalizer, and means for controlling the gain of the receiving equalizer according to the difference between the detected level at the output of the receiving equalizer and a predetermined level.

3. An automatic equalization system according to claim 1, further comprising a pre-equalization level distributor means for processing the equalization level of the receiver detected at the input of the transmitting equalizer, said distributor means having a portion of its characteristic, between the input signal and the output signal, non-linear, thereby preventing the overload of the repeaters inserted in the transmission line.

4. The invention as defined in claim 3, wherein said pre-equalization level distributor means comprises a variable gain DC amplifier and a limiter.

5. An automatic equalization system provided at the transmitter of a communication system having a transmitter and a receiver comprising a transmitting equalizer, a pilot signal generator provided at the input of the transmitting equalizer, means for detecting the level of the pilot signal at the output of the transmitting equalizer, means for receiving a signal from the receiving station concerning the pilot level at the input of the receiving equalizer, means for determining the ratio of the equalization of the transmitting equalizer and the receiving equalizer, and means for controlling the gain of the transmitting equalizer so that the sum of the detected level at the output of the transmitting equalizer and the output of said means for determining the ratio is a predetermined value.

6. An automatic equalization system provided at the receiver of a communication system having a transmitter and receiver, comprising a receiving equalizer, means at the input of the receiving equalizer for detecting the level of a pilot signal sent from the transmitter, means for transmitting the signal back to the transmitter relating to the level detected at the input of the receiving equalizer, means for detecting the pilot signal level at the output of the receiving equalizer, and means for controlling the gain of the receiving equalizer according to the detected level at the output of the receiving equalizer so that the level at the receiving equalizer becomes a predetermined level.

* * * * *